United States Patent
Lisin et al.

(10) Patent No.: US 10,578,253 B2
(45) Date of Patent: Mar. 3, 2020

(54) METHOD FOR MONITORING THE POSITION OF ABOVE-GROUND PIPELINES UNDER PERMAFROST CONDITIONS

(71) Applicants: Public Joint Stock Company "Transneft", Moscow (RU); L.L.C. "Transneft Research and Development Institute for Oil and Oil Products Transportation", Moscow (RU)

(72) Inventors: Yury Viktorovich Lisin, Moscow (RU); Pavel Aleksandrovich Revel-Muroz, Moscow (RU); Zufar Amirovich Zaripov, Kazan (RU); Anatoly Evgenevich Soshchenko, Moscow (RU); Aleksei Vladimirovich Khabarov, Moscow (RU)

(73) Assignees: PUBLIC JOINT STOCK COMPANY "TRANSNEFT", Moscow (RU); L.L.C. "TRANSNEFT RESEARCH AND DEVELOPMENT INSTITUTE FOR OIL AND OIL PRODUCTS TRANSPORTATION", Moscow (RU)

( * ) Notice: Subject to any disclaimer, the term of this patent is extended or adjusted under 35 U.S.C. 154(b) by 582 days.

(21) Appl. No.: 15/226,897

(22) Filed: Aug. 2, 2016

(65) Prior Publication Data
US 2017/0030527 A1 Feb. 2, 2017

Related U.S. Application Data

(63) Continuation of application No. PCT/RU2014/000221, filed on Mar. 28, 2014.

(51) Int. Cl.
*G01S 19/42* (2010.01)
*F17D 5/00* (2006.01)
(Continued)

(52) U.S. Cl.
CPC ............ *F17D 5/00* (2013.01); *F16L 1/026* (2013.01); *G01S 19/14* (2013.01); *G01S 19/42* (2013.01);
(Continued)

(58) Field of Classification Search
CPC ........ G01S 19/14; G01S 19/42; G01S 19/421; G01S 19/423; G01S 19/425; G01S 19/48; F17D 5/00; F16L 1/026
(Continued)

(56) References Cited

U.S. PATENT DOCUMENTS

| 4,452,087 A | 6/1984 | D'Antonio |
| 5,450,765 A * | 9/1995 | Stover ................. F16L 55/11 |
| | | 138/90 |

(Continued)

FOREIGN PATENT DOCUMENTS

| CO | 6940075 | 4/2014 |
| EP | 2985509 | 2/2016 |

(Continued)

OTHER PUBLICATIONS

VSN 013-88. Vedomstvennye stroitelnye normy. Stroitelstvo magistralnykh I promyslovykh truboprovodov v usloviyakh vechnoi merzloty. Moscow, VNIIST Minneftegazstroya, Jan. 1, 1989, p. 1-14, 13-17; (40 pages).
(Continued)

*Primary Examiner* — Chuong P Nguyen
(74) *Attorney, Agent, or Firm* — One LLP; Jonathan Jaech (57) ABSTRACT

The invention relates to engineering geodesy for monitoring a height and deformation of a pipeline. The invention includes use of a complex of interrelated monitoring measures that include monitoring a control position of deformation control benchmarks using optic geodetic devices and
(Continued)

mobile satellite geodetic receivers. A state geodetic network is used only at an initial stage for reference of the network sites to the local system of coordinates. Geodetic measurements are then converted to a local system of coordinates. The invention decreases an amount of time and labor for detection of the oil pipeline coordinates for operational needs and simplifies a planned high-altitude position data exchange, storage and transfer during measurement.

18 Claims, 7 Drawing Sheets

(51) Int. Cl.
*F16L 1/026* (2006.01)
*G01S 19/14* (2010.01)
*G01S 19/48* (2010.01)

(52) U.S. Cl.
CPC ........... *G01S 19/421* (2013.01); *G01S 19/423* (2013.01); *G01S 19/425* (2013.01); *G01S 19/48* (2013.01)

(58) Field of Classification Search
USPC ........................................ 342/357.25, 357.31
See application file for complete search history.

(56) References Cited

U.S. PATENT DOCUMENTS

| | | | |
|---|---|---|---|
| 6,084,989 A | 7/2000 | Eppler | |
| 6,170,344 B1 | 1/2001 | Ignagni | |
| 6,240,160 B1* | 5/2001 | Daaland | G01N 23/04 378/59 |
| 6,243,483 B1 | 6/2001 | Petrou et al. | |
| 6,243,657 B1* | 6/2001 | Tuck | G01N 29/2412 324/207.13 |
| 6,553,322 B1* | 4/2003 | Ignagni | F16L 55/48 701/32.4 |
| 6,768,959 B2 | 7/2004 | Ignagni | |
| 7,680,625 B2* | 3/2010 | Trowbridge, Jr. | F17D 5/00 340/605 |
| 8,076,928 B2* | 12/2011 | Nunally | F17D 5/00 324/220 |
| 8,261,623 B2* | 9/2012 | Miller | F16L 55/48 73/865.8 |
| 8,502,687 B2* | 8/2013 | Wang | F17D 5/00 340/605 |
| 8,689,653 B2 | 4/2014 | Cogen et al. | |
| 8,961,071 B2* | 2/2015 | Critsinelis | B63B 22/00 405/171 |
| 9,013,958 B2 | 4/2015 | Zhang et al. | |
| 9,128,019 B2* | 9/2015 | Wayman | F17D 5/00 |
| 9,746,444 B2* | 8/2017 | Goroshevskiy | G01N 27/82 |
| 10,077,541 B2* | 9/2018 | Lisin | F16L 3/16 |
| 2006/0225507 A1 | 10/2006 | Paulson | |
| 2010/0023303 A1* | 1/2010 | Smith | F17D 5/00 702/188 |
| 2011/0161038 A1 | 6/2011 | Sutherland | |
| 2013/0043887 A1* | 2/2013 | Ziolkowski | F17D 5/00 324/649 |
| 2013/0234860 A1 | 9/2013 | Sollacher et al. | |
| 2014/0313321 A1* | 10/2014 | Olsson | G01C 21/165 348/135 |
| 2015/0098539 A1 | 4/2015 | Iann et al. | |
| 2019/0212131 A1* | 7/2019 | Spencer | G01B 11/22 |

FOREIGN PATENT DOCUMENTS

| | | |
|---|---|---|
| KR | 20110057066 | 12/2012 |
| RU | 49251 | 11/2005 |
| RU | 2317466 | 10/2007 |
| RU | 2334162 | 9/2008 |
| RU | 2357205 | 5/2009 |
| RU | 2413055 | 2/2011 |
| RU | 2451874 | 5/2012 |
| RU | 2527902 | 5/2014 |
| RU | 2582428 | 9/2015 |
| WO | WO2015106340 | 7/2015 |

OTHER PUBLICATIONS

VRD 39-1, 10-006-2000. Pravila tekhnicheskoi ekspluatatsii magistralnykh gazoprovodov (PTE MG). Moskva, OOO "IRTS Gazprom", Jan. 12, 2002, p. 1-3, 20-206, 11-121; (207 pages).
Satellite Imaging Corporation; "*Pipeline and Transmission Surveys*"; http://www.satimagingcorp.com/applications/energy/pipeline-transmission/; Jul. 21, 2016; (4 pages).

* cited by examiner

METHOD FOR MONITORING THE POSITION OF ABOVE-GROUND PIPELINES UNDER PERMAFROST CONDITIONS

CROSS-REFERENCE TO RELATED APPLICATIONS

This application claims the benefit and priority of PCT Pat. App. No. PCT/RU2014/000221, titled METHOD FOR MONITORING THE POSITION OF ABOVE-GROUND PIPELINES IN PERMAFROST CONDITIONS and filed on Mar. 28, 2014, also published as WO/2015/147686.

FIELD

The invention relates to geodesy engineering for monitoring pipelines in permafrost conditions and, in particular, to a system for monitoring above-ground major pipelines in different topographic, geological, hydrogeological and weather conditions to detect a height and deformation of the pipe.

BACKGROUND

Patent application KR20110057066 (IPC G08B 21/18, published on 24 Dec. 2012) discloses a method for controlling a condition of an oil pipeline that includes collecting information about the condition of the pipeline using different channels, including a video channel, infrared rays, etc. A conclusion regarding the condition of the pipeline may be reached based on the combination of results of the data from all information channels. The method has a relatively high precision of measurement, however, the method may not be used in the far north and in distant regions because it is impossible to provide an electrical supply, a stable operation, and reliability of the precision instrument set because of extremely low temperatures and remoteness from settlements.

Systems and methods of geotechnical monitoring of an above-ground pipeline are described in the abstract of "Control of the deformed condition of above-ground pipelines in the permafrost zone" by A. S. Vitchenko (the Scientific Library of the theses and abstract may be found at disserCat http://dissercat.com). These methods for monitoring a deformed condition of above-ground pipelines are used during planning and implementation of repair and restoration of gas-field pipelines, such as process pipelines of BCS bindings. The methods include determining allowable geometrical parameter values of above-ground pipelines. To determine evaluation criteria for the deflected condition of pipelines, the parameters that describe the geometrical form of deformed portions are used. Such parameters include the slope of the straight-line portion of the pipeline and the change of deflection compared with the basic measurement. These data are also obtained upon indices of deformation control benchmarks.

An invention disclosed by RF patent No. 2357205 (IPC G01B11/16, published on 27 May 2009) relates to a system for determination of deformations in construction structures and buildings. The device includes a motorized electronic tachymeter with a glass protective cap that is installed inside the building with a foundation block, a support contour, and a cover.

The tachymeter is coupled to a computer via a cable and is capable of optical contact with deformation control benchmarks, such as triple prismatic reflectors installed on controlled construction structures. The benchmarks installed on the structures are fixed by clamps on outputs of a cover. One of these benchmarks is a control is equipped by an additional reflector. The distance between reflectors is determined using a metrological method based on measured coordinates.

The drawback of the system is that the electronic tachymeter cannot be provided with constant electrical feeding in remote conditions and permafrost. Moreover, precise positioning and workability of the tachymeter may be interrupted if the tachymeter is installed in a remote location without security and under conditions of atmospheric and natural impacts.

RF patent No. 2413055 (IPC E02D1/08, published on 27 Feb. 2011) is related to a method for measuring foundation settlements that include periodical measurements of a position of a benchmark located on a foundation relative to a virtually immovable marker. The position of the benchmark on the foundation is measured by a linear movement sensor relative to the virtually immovable marker. The virtually immovable marker is located under the benchmark in the ground below the frozen soil and the zone of deformation of the foundation.

The drawback of the method is the absence of an option to switch operation of the sensor on or off, taking into account the relatively large number of them on a major pipeline. Moreover, the application of this method is quite narrow and it is not available for the use as a means for monitoring major pipelines because there are no means for accumulation and treatment of the data.

The objective of the present disclosure is an increase in operational reliability and environmental safety of high-pressure pipeline systems used to transport hazardous liquids and gases, such as oil and gas, by introducing a modern monitoring and diagnostic method for pipeline systems. The methods evaluate a technical condition and correspondence of current parameters to technical values, in particular, to a height of the pipelines.

SUMMARY

The technical result achieved using the method is a complex of interrelated monitoring measures that include a control benchmark and deformation control benchmarks, along with optical geodetic devices and mobile satellite geodetic transmitters. A state coordinate system is used at an initial stage to attach sites of the network to a local coordinate system. Use of the method provides a decrease of time and labor for determining coordinates of portions of an oil pipeline for operational needs. The method also provides simplification of procedures for communication, storage and transmission of data regarding a height of portions of oil pipelines, an increased precision of such measurements, and an increased rate of determining results regarding the current condition of the pipelines and their supports from the obtained data.

The relatively high quality of the system is provided by:
a stable spacial position of the sites in the local geodetic network;
an option to control stability of the spacial position of the sites in the local geodetic network at every measurement of the planned high-altitude position (PHAP), or height, of the pipeline;
a highly precise determination of a position of neighboring network sites;
an adequate density of sites and a relatively short amount of time required to measure coordinates with high precision; and simple and available measurement procedures for staff of an operating company.

The result is achieved using a method for controlling a position of above-ground pipelines in permafrost conditions that is disclosed herein. The method includes installing deformation control benchmarks on piles of a support foundation that are spaced from the ground surface by at least 0.5 meters (0.5 m) during assembly of the pipeline, and installing ground deep benchmarks spaced from each other by no more than 1.5 kilometers (km) and spaced from supports by no more than 50 m. The method also includes installing reference stations spaced from each other by between 20 km and 40 km. The reference stations provide their precise positioning along with additional data to a server. The server uses this data to calculate necessary adjustments to the system and transmits the calculated adjustments to movable GPS/GLONASS transmitters (rovers). The rover can then display precise coordinates of its location to an operator in real-time.

During installation of ground deep benchmarks and reference stations, their coordinates are detected using a first, or state, geodetic network. The obtained coordinates are translated to a second, or local, geodetic network using a key. Local coordinates are transmitted to the server. Afterwards, a first cycle for measuring the deformation control benchmark coordinates relative to ground deep benchmarks is performed using the local coordinate network.

A single measurement takes between 1 and 3 minutes. However, this is advantageous as compared to traditional methods for measuring site coordinates via a "Static" mode, i.e. with no automatized network. The traditional method requires 20-30 minutes to measure coordinates of 1 site and also requires post-treatment of the data using special software on a mobile computer or WKS. Data from an initial measurement of planned high-altitude positions of the pipeline is taken from deformation control benchmarks and deep benchmarks. This data is transmitted to the server where, upon results of the initial cycle measurements, a design digital model of the pipeline is built.

Then, at every control measurement, data regarding the height, or planned high-altitude position, of the deformation control benchmarks and deep benchmarks is taken with the help of a rover. The data is then transmitted to the server where a current digital model of the pipeline is built and compared with the design digital model of the pipeline. The server determines or detects parts of the pipeline where deflection of its current position relative to the design position is higher than acceptable values, and thus, the part of the pipeline where the supports have a deflected position is detected.

The data regarding the current planned high-altitude position (PHAP, height) on the initial cycle is taken by optical geodetic devices (such as a level, a theodolite, or a tachymeter). During a first year of a pipeline service, the PHAP (height) data is taken by the rover no less than once a month. During service, the PHAP data is taken at least twice a year.

Deformation control benchmarks used for implementation of the claimed method are made of rolled steel, for instance, an angled piece of steel or a pipe or bar that forms a sharp angle. The benchmarks are fixed to a metal pilework or to a head of a support pile in such way that the top of the sharp angle is the top point of the deformation control benchmark, from which the height data of the pipeline support foundation is taken.

Deep benchmarks used in the system include a metal pipe having a diameter of 57 millimeters (mm) and a length of 11.6 m. Deep benchmarks also include a head made of stainless steel having a polished spherical surface. The deep benchmarks also include a concrete "anchor" installed in a bore having a diameter of 500 mm. The deep benchmark also includes a protective case made of a metal pipe having a diameter of 426 mm. the protective case is filled with a sand non-frost-susceptible soil. Each deep benchmark is installed to a depth that is no less than the depth of the border of the permafrost and the maximum seasonal soil thawing, increased by 1 m. Furthermore, the depth of each deep benchmark is at least 11 m.

Sensors of the planned high-altitude position may be installed on pipeline compensators. The sensor data is transmitted to the server, via the reference station, with the help of a fiber-optic communication link or a radio modem. If the rover is separated from reference stations by less than 8 km or 10 km, any PHAP measurement error is 25 mm or less. If the rover is separated from reference stations by between 15 km and 20 km, any PHAP measurement error is 40 mm or less. Each reference station includes an aerial global navigation satellite system (GNSS) receiver with multi-path and re-reflected signal suppression systems. The reference station also includes a device for fixation to an immovable object. The reference station also includes an interface to connect to a computer having a controller function to set up the equipment of the permanent reference station. The reference station also includes software to perform main functions of the reference station. The reference station also includes a standby power unit (if necessary).

DETAILED DESCRIPTION

The drawing illustrate the following features and corresponding reference numbers:
1—a deep benchmark of a local geodetic network,
2—a reference station,
3—a deformation control benchmark,
4—a pile,
5—a pipeline,
6—a pipeline support,
7—a server,
8—a means of measurement, and
9—a benchmark of the state geodetic network.

The claimed method is implemented during service of the pipeline 5 at the geodetic network device. However, initial measures are taken as early as during assembly of the pipeline 5 and installation of supports 6.

The geodetic network on the major pipeline uses a single coordinate system (or several interrelated coordinate systems). Precision of the network building provides for safety margin evaluation and residual resources of the pipeline in a condition monitoring mode. The geodetic network is built along the pipeline as reference stations 2 (above-ground geodetic sites) linked with a data processing center. The network also includes many special deformation control benchmarks fixed on the pipeline support 6. Special geodetic transmitters of a navigation signal from global navigation satellite systems (GNSS) or global positioning systems (GPS) are used as reference stations 2.

To control the high-altitude position (height) of the oil pipeline 5, monitoring of the condition of the corresponding elements as well as the condition and effectiveness of engineering protection measures is performed during the period of the major pipeline construction and service. The following preparation measures are taken.

Figure 1:
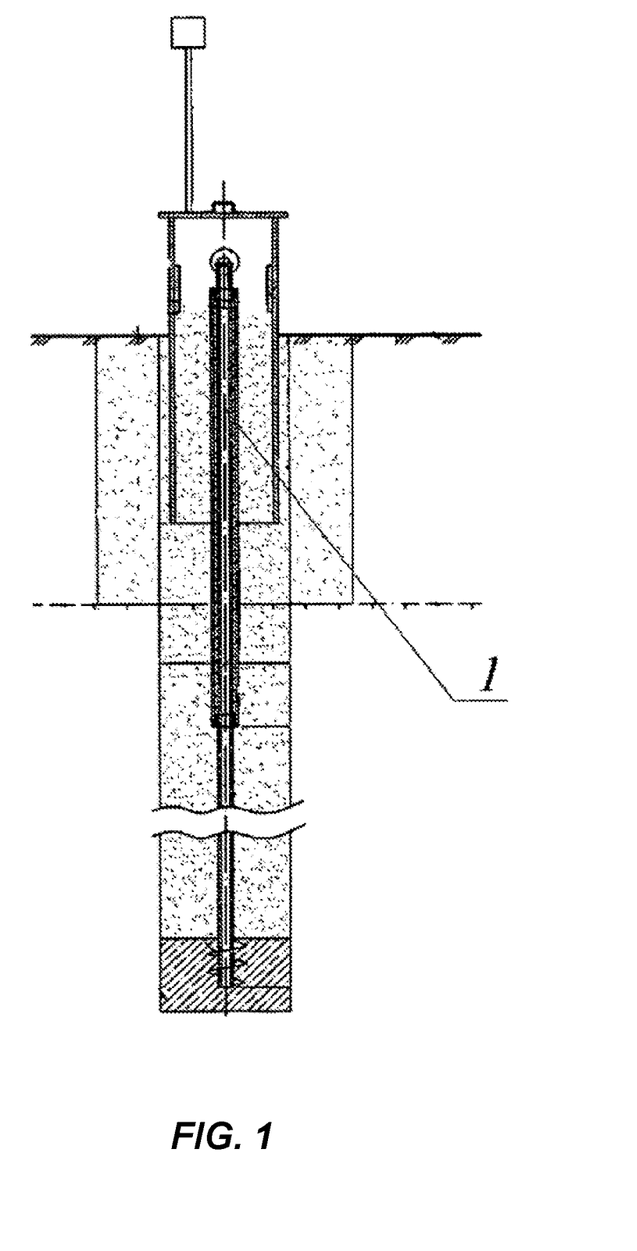
FIG. 1 illustrates an option for installing deep benchmarks.

1. Deep benchmarks 1 are installed along the pipeline 5. The deep benchmark 1 consists of a metal pipe (the benchmark pipe) having a diameter of 57 mm and a length of 11.6 m. The benchmark includes a head and a concrete "anchor" installed into a bore having a diameter of 500 mm. The special spherical head is welded to the top part of the benchmark pipe. It is made of stainless steel with a polished spherical surface having a radius of 25 mm. A 3-mm deep hole is drilled into the spherical head. The lower part of the deep benchmark is equipped by the "anchor" to increase stability and counteract any possible frost heaving forces. The "anchor" may be made by two methods: either at the place of the benchmark assemblage or in a factory. If the "anchor" is made in the field (on the site of the benchmark assemblage), a sheet that is 4 mm thick, 50 mm wide and 1,000 mm long is welded at the end of the benchmark pipe as a "screw". Then a concrete and sand solution that is 20 cm thick fills the bore with the installation of an embedded detail. The embedded detail is made of a pipe having a diameter of 57 mm. The 4×50 mm sheet is welded to the embedded detail. The "anchor" is linked to the benchmark pipe via a screw joint. The benchmark pipe is protected against frost heaving forces with the help of a protective pipe. The protective pipe has a diameter of 89 mm and has two sealing cuffs at ends. The space between the benchmark and the protective pipes is filled by a lubricant TSIATIM 221 or its analogue, taking into account a desirable lubricant service life of no less than 40 years and a service temperature that ranges from minus 60 degrees Celsius (° C.) to plus 150° C. To protect the deep benchmark from destruction or damage, it is equipped by a protective case made of a metal pipe having a diameter of 426 mm that is filled with non-frost-susceptible soil, such as sand. The protective case is installed into the pre-drilled bore having the diameter of 500 mm. The lid of the case is also made of a pipe having a diameter of 426 mm that is made of a sheet steel that is 8 mm thick. For the lid to be tightly closed on the case, 4 special guideways that are 200 mm long and made of segments of the pipe with the diameter of 426 mm are welded to the internal surface of the case. The special identification mark is welded at the top of the lid. It is made of fittings that are 800 mm long and from a metal sheet that is 3 mm thick. It bears the number of the benchmark and the name and contacts of the operating company. Banking around the deep benchmark within a radius of 1.0 m and to the depth of the maximum seasonal thawing (2.5 m) is made of non-frost-susceptible soils (such as dry medium- or small-grained sand).

Figure 3:
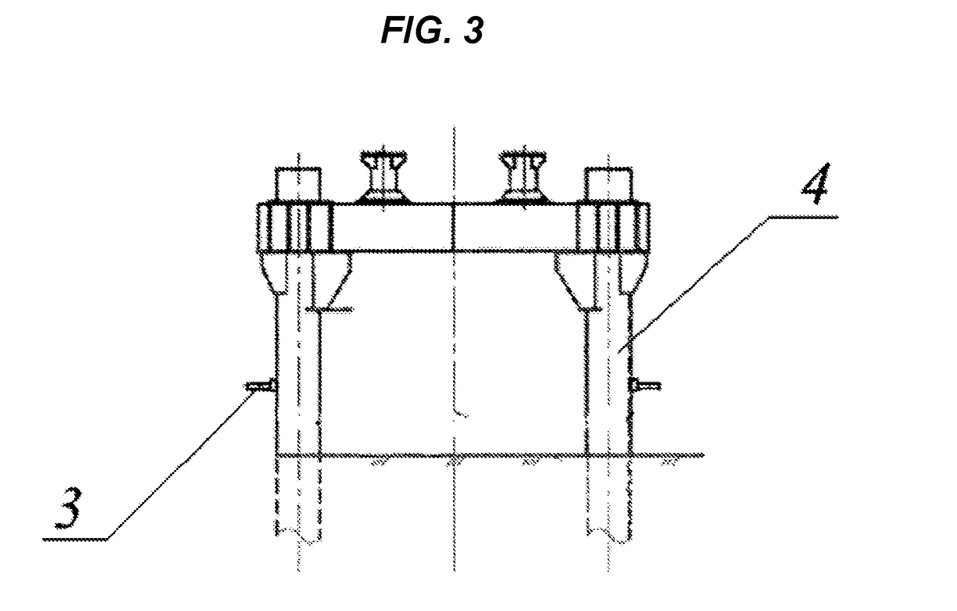
FIGS. 3 and 4 illustrate options for installing deformation control benchmarks on a pile of a support foundation.
Figure 4:
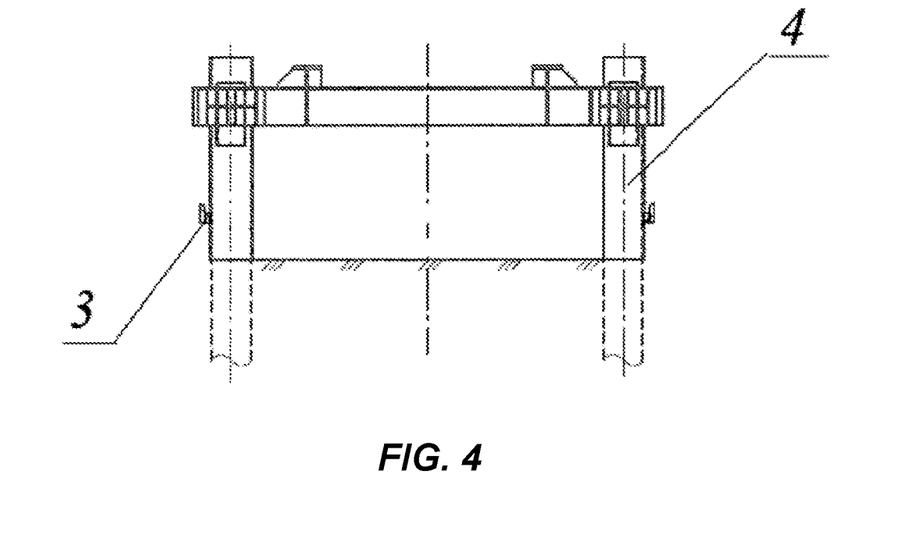

2. Deformation control benchmarks are installed on all supports of the controlled pipeline as geodetic marks 3. The marks 3 used for surveillance of deformations of the aboveground oil pipeline 5 are installed on piles 4 of the support 6. Deformation control benchmarks 3 are made of a rolled steel (reinforced, round steels, angles etc.) with facing to receive a spherical surface at a vertical installation forming an angle, or by cutting of the angle for a fixed installation of a rail if the angle is installed in a horizontal position. The deformation control benchmark 3 may be directly fixed on the load-bearing structure or through an additional channel section. The fixture is usually made by a welded seam to pile heads. Deformation control benchmarks 3 are given an index number for accounting and their high-altitude position (height) is initially measured. The number of deformation control benchmarks 3 fixed on the pipeline significantly depends on precision requirements regarding the position high-altitude position (PHAP) values and functions of the in-line inspection device.

Figure 2:
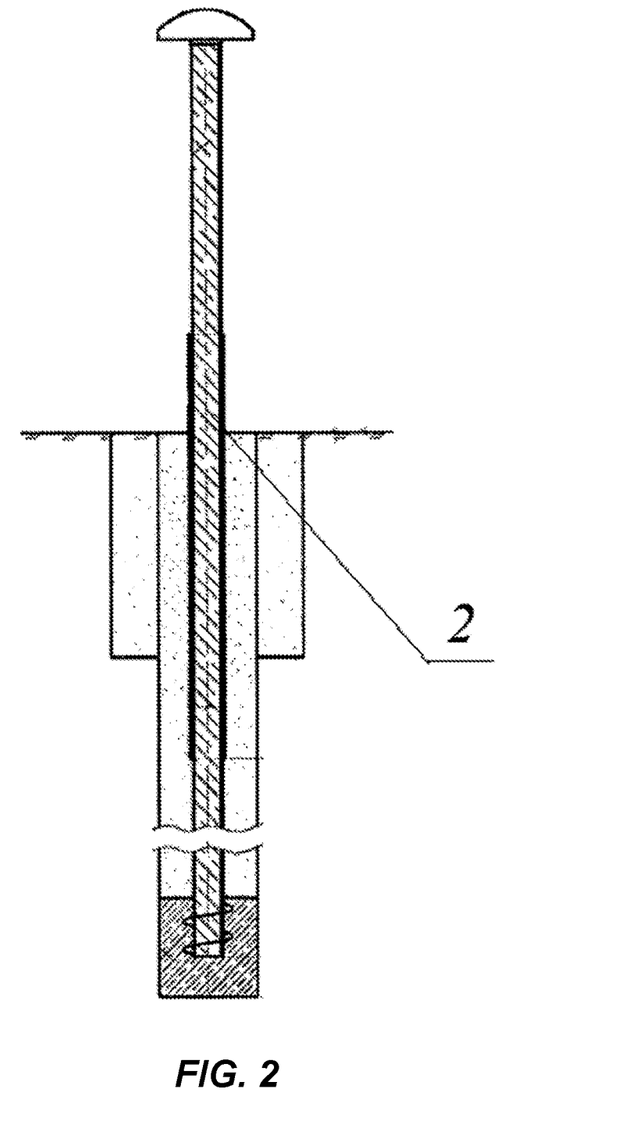
FIG. 2 illustrates an option for installing an aerial reference station.

3. A network of permanent reference stations 2 is installed along the pipeline 5. This network services the whole territory of the major pipeline. The network of reference stations 2 includes permanent satellite (GNSS) reference stations installed at the site upon the preset scheme. The relative position of the reference stations 2 is determined using a single system of coordinates. Reference stations 2 are united by communication channels for collection and processing of the geodetic data in a single geodetic data storage and processing Center (GDSPC server) to provide for measurements and detection of spatial position of objects on the large territory with equal precision and in a single time and space counting system. Reference stations 2 are placed on buildings and structures within the service zone of the major pipeline, or placed on special deep benchmarks. Thus, two types of stations are installed—stations with a bit and with an external aerial part which is fed by any possible energy source (a high-voltage power line, an independent source) and stations installed on a block box of isolation valve management. Stations of the second types are containers fixed on the roof of the block box where screens for management of the automatic reference station are concentrated.

The equipment of permanent reference stations includes:

multi-frequency navigation units of GLONASS or GLONASS/GPS consumer equipment (such as transmitters);

multi-frequency GLONASS or GLONASS/GPS geodetic aerial GNSS units with multi-path and re-reflected signal suppression systems and a phase center eccentricity rate of no more than 2 mm. The GNSS is fixed on an immovable object;

a computer with a controller function to set up the equipment of the permanent reference station 2;

software to perform main functions of the reference station;

a standby power unit (if necessary); and a conditioner (if necessary).

Customer equipment includes mobile stations (rovers) equipped by multi-frequency GLONASS or GLONASS/GPS consumer navigation units (such as receivers) with a phase use mode and communication means. The customer equipment includes the following equipment:

multi-frequency consumer navigation units of GLONASS or GLONASS/GPS with a phase mode;

multi-frequency compact GLONASS or GLONASS/GPS aerial sensors of the geodetic class;

the controller and the software to perform main functions of the mobile station;

a mobile computer with special software to collect and process field measurements, with an option for connection to the network, and to collect the navigation data stored in the GDSPC (geodetic data storage and protection center) (only for the delayed processing mode "POST"). The design solution of the customer equipment is not subject to the claimed invention and not represented on figures.

The geodetic data storage and protection center (GDSPC) is installed in the administrative building for administration of the oil pipeline. The GDSPC includes one or several servers with special network software. The computer center performs:

communication with satellite transmitters of individual base stations 2 and setup of their internal parameters;

receipt of the data from the base stations 2, quality testing, and automatic recordation of data files to a hard disc of a computer (such as the administration center server);

transfer of the data to RINEX format and storage of files on an FTP server or website for Internet user access;

adjustment of information for users that detect their location within the coverage area of the base station network;

transfer of the adjusted data via different communication channels (such as radio, cellular network, or Internet);

generation of messages and maintenance of an event log during operation of the administration center, and notification to the operator of the administration center about changes in the condition of the basic station satellites, communication lines and users that interact with the system.

Moreover, the software of the administration center helps to organize control of online user interaction by identification of users and accounting of RTK measurement sessions, automatic processing of user measurements together with the basic station data, and calculation of the coordinates of the user objects and creation of reports.

GDSPC must provide:

continuous receipt of the data from global navigation satellite systems from the permanent reference stations 3;

long-term storage (for no less than 1 year) of the received data from every permanent reference station 3;

complex mathematical processing of the data received in the online mode from permanent reference stations 3;

online visualization of the data received from permanent reference stations 3 and results of the data processing;

remote diagnostics of permanent reference stations 3;

remote configuring of permanent reference stations 3;

remote programming of permanent reference stations 3;

high reliability and fail-safety.

The equipment of the GPS/GLONASS receiver must include:

multi-frequency navigation units of the GLONASS consumer or GLONASS/GPS of the phase mode;

multi-frequency compact GLONASS or GLONASS/GPS aerial of the geodetic class;

controller and the software to perform the main functions of a mobile station;

a mobile computer with special software to accumulate and process field measurements, with an option to switch to the network and to receive the navigation data stored in the GDSPC (only for the delayed processing mode "POST").

GPS/GLONASS transmitters must be specially developed for use in reference station networks.

The satellite equipment of GLONASS or GLONASS/GPS systems is used for geodetic works on permanent reference stations 3.

The high-altitude position (height) of the pipeline is set up by spatial coordinates of its axis as control points.

To implement the claimed method with the use of the equipment and units described above, the following is performed.

Figure 5:
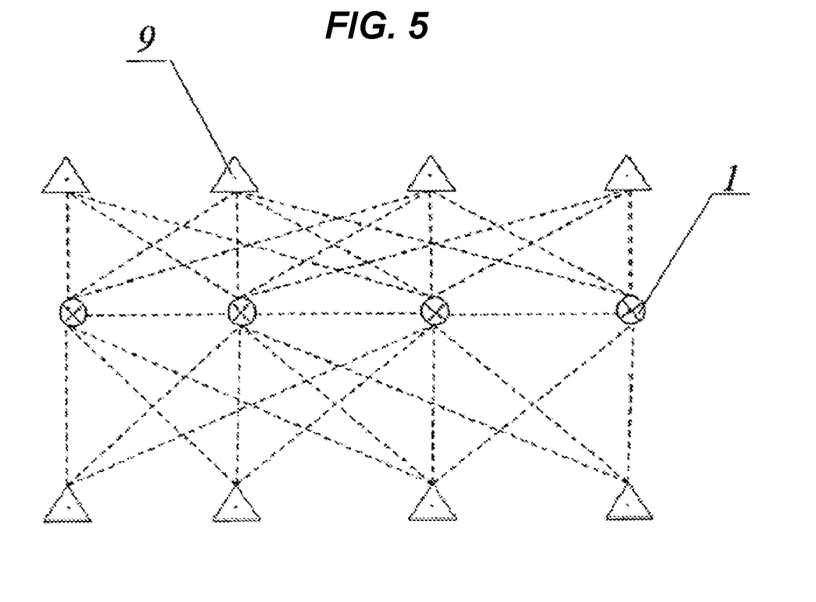
FIGS. 5-11 illustrate relative locations of deformation control benchmarks, deep benchmarks, reference stations, benchmarks of a state geodetic system, and a relation therebetween.

FIG. 5 outlines the first stage of implementation of the claimed method—creation of the local support geodetic network including deep benchmarks 1. The deep benchmarks 1 have coordinates determined based on benchmarks of the state geodetic network 9 by detection of coordinates and high-altitude marks. With the help of a key, the coordinates are translated to coordinates of the local geodetic network. The local geodetic network is installed along the pipeline. The number of sites for determining the PHAP must be no less than the number provided by the documents that regulate the location survey at the life-size offset of the pipeline route. According to the rules of the location survey, control points are detected no less than at every 100 m, at every 10 m on individual sites, and at sites where the direction of the pipeline axis is changed (including profile bending points).

Figure 6:
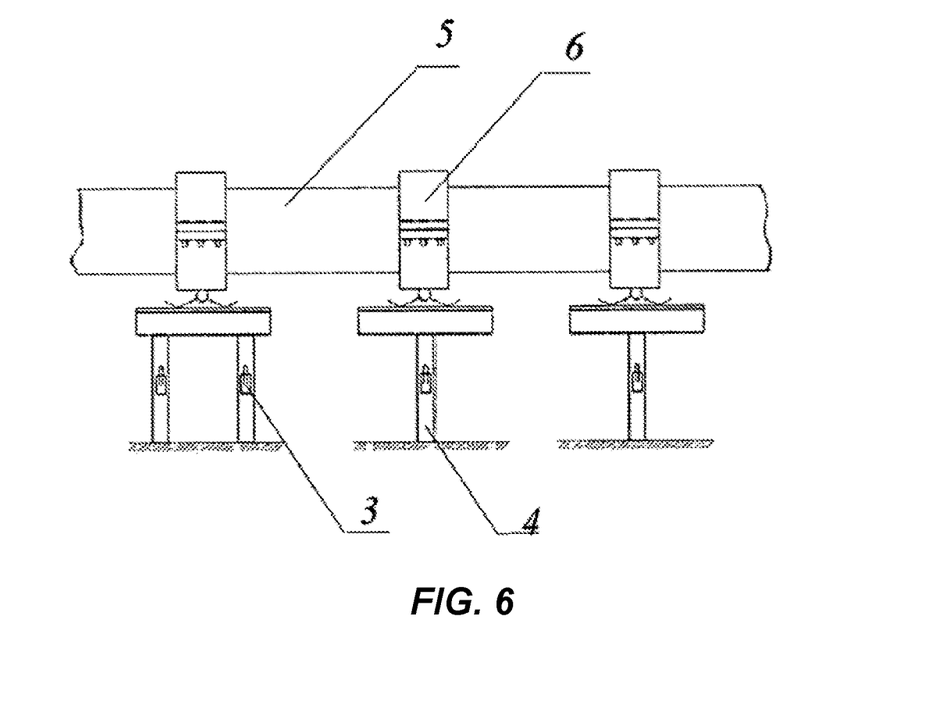

FIG. 6 outlines the second stage of implementation of the claimed method—installation of deformation control benchmarks 3 on supports 6 of the above-ground pipeline.

Figure 7:
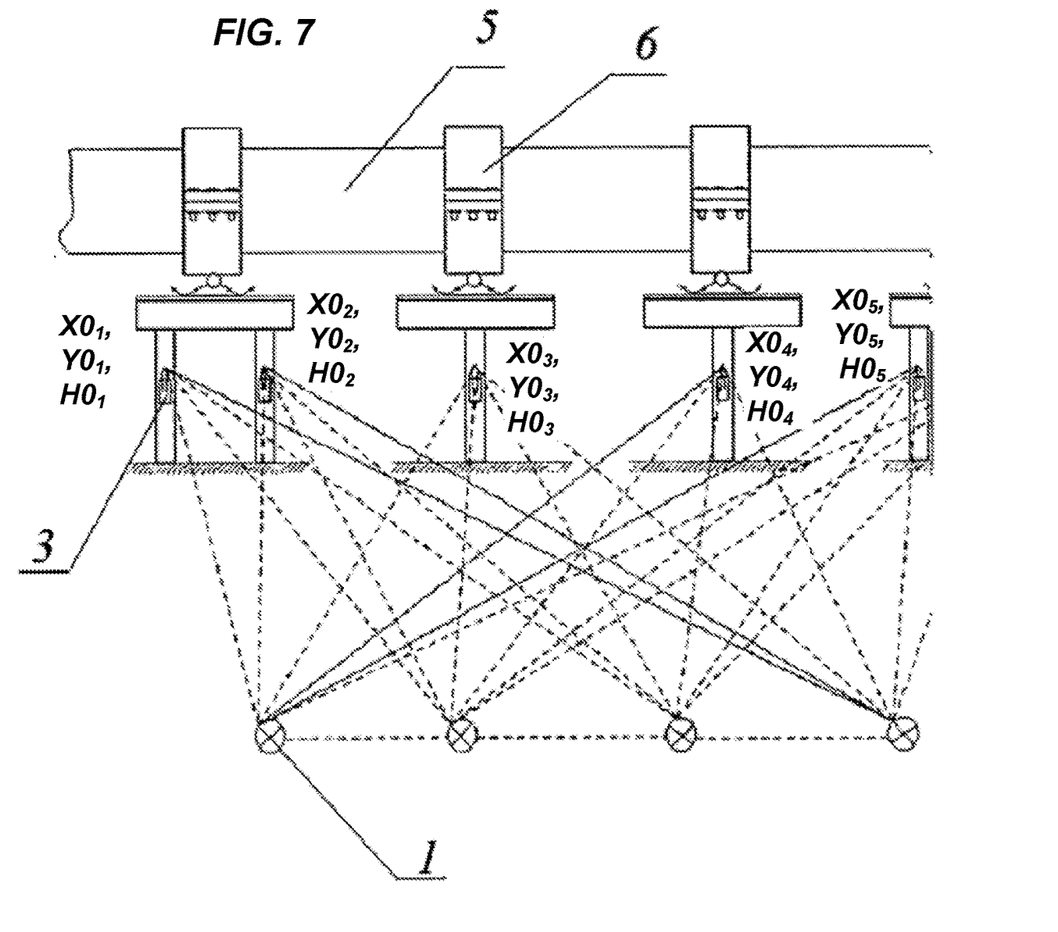

FIG. 7 outlines the third stage of implementation of the claimed method—carrying out of the initial cycle for measurement of deformation control benchmarks 3 including receipt of their coordinates and high-altitude marks in relation to coordinates of deep benchmarks 1 of the local support geodetic network. Coordinates of marks (the level, the transit, the tachometer) are measured with the help of measurement means 8, such as optic geodetic devices including a level, a theodolite, and/or a tachymeter. Thus, the database of the initial measurement cycle is formed that characterizes the design position of the pipeline. The database and the digital pipeline model that contains values of the pipeline PHAP are stored on the server 7.

Figure 8:
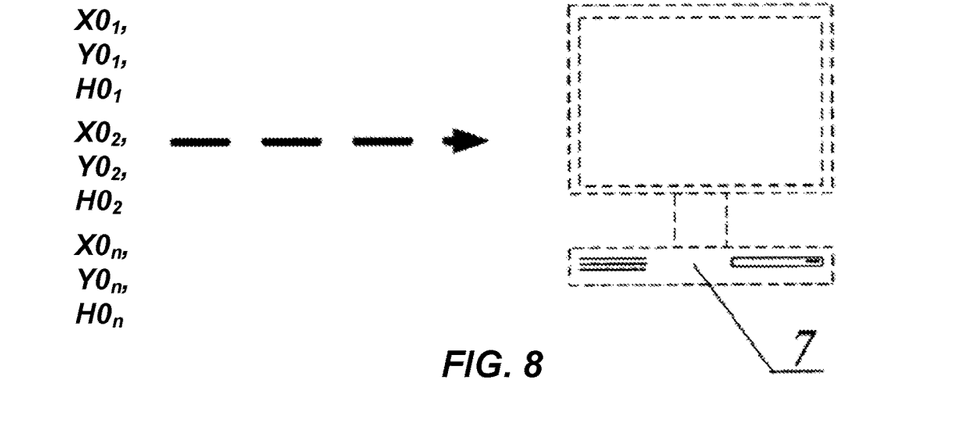

FIG. 8 outlines the fourth state of implementation of the claimed method—receipt and processing of the data of the initial measurement cycle and building of the digital pipeline model upon taken indices. The data is transferred to the server 7 that performs the said procedures and stores the processed data for the further use.

Figure 9:
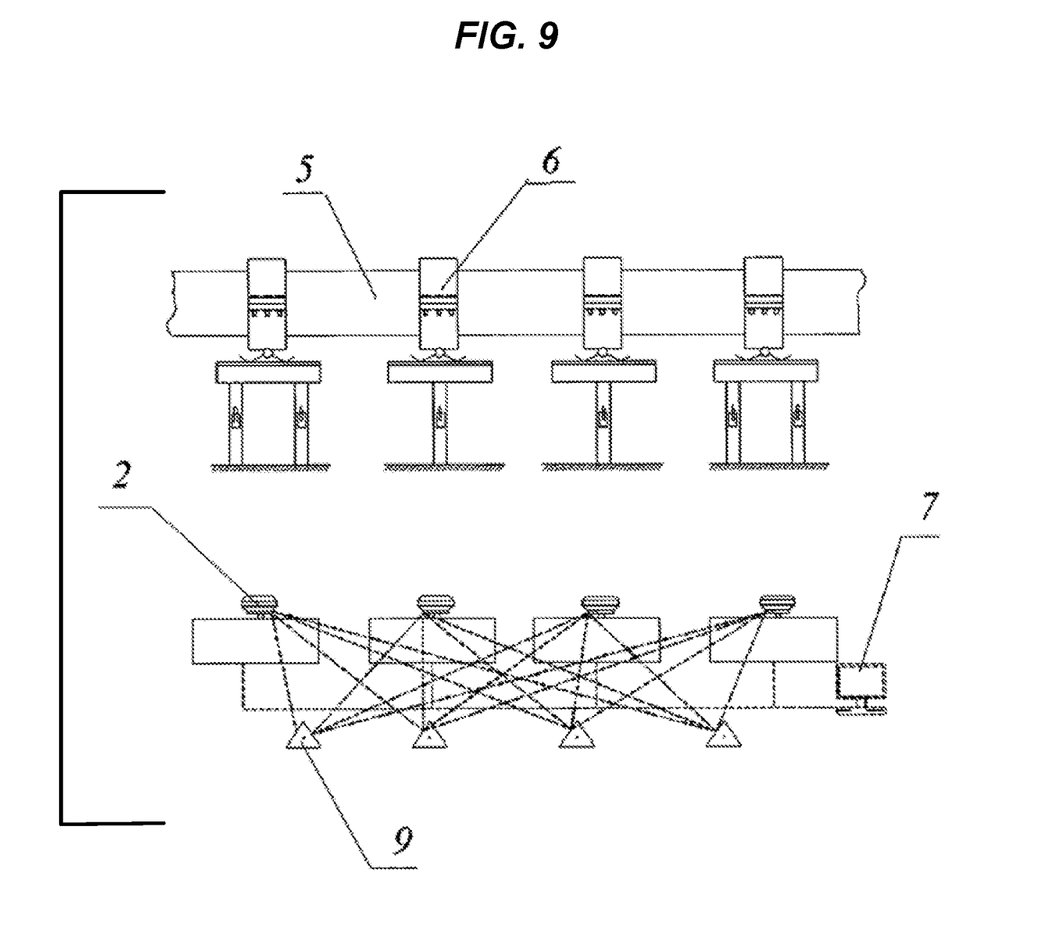

FIG. 9 illustrates the location of reference stations 2 and detection of their coordinates upon benchmarks of the state geodetic network 9 with further translation to local geodetic coordinates using the key. Reference stations 3 provide adjusting data for the highly precise detection of the coordinate data onsite with the help of rovers. The material implementation of the local system of coordinates is provided by the network of geodetic sites located at the site and built as a complex of interrelated reference stations.

Figure 10:
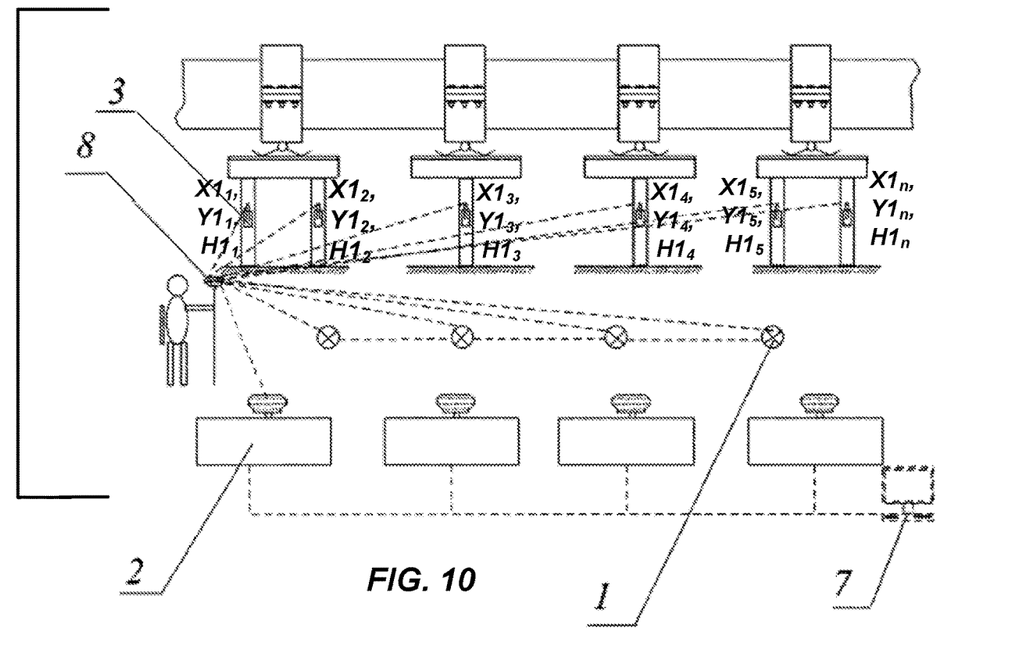

FIG. 10 outlines the process of local measures for control of the pipeline position. The operator, using a rover that receives the adjusting data from reference stations, collects the coordinate data and height data from deformation control benchmarks 3 and deep benchmarks 1. This data is transferred to the server for analysis and processing.

Figure 11:
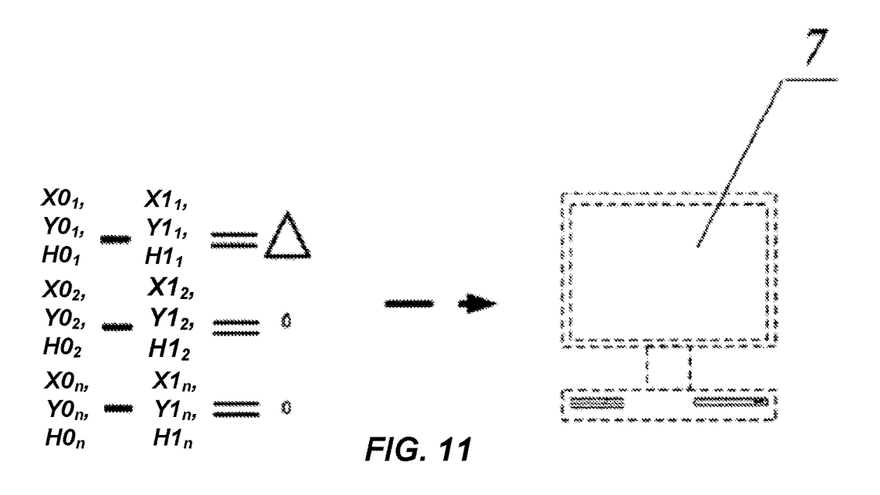

FIG. 11 represents the final stage of implementation of the claimed method that includes comparison of the data received and processed by the server at formation of the initial measurement cycle with the data of the current measurement cycle received from rovers. Upon results of this comparison, the server detects identity of the initial position and the current position of measurement points and/or records position deflection. If during processing the server detects deflection of any measurement point from the initial cycle value, this point is identified based on its coordinates. The part of the pipeline with deflection is identified and measures for recovery of the pipeline design position and, consequently, of the measurement point, are taken. The deflection may only be identified when the deflection is greater than a predetermined amount.

The server must be provided with continuous connection to reference stations and receive the data with the preset frequency of updates. Different methods may be used for the data transfer from reference stations to the server (to the administration center):

Continuous analog or digital modem lines may be used. The modem in the administration center may be linked to the COM directly, through RS232, but if several reference stations must be linked, the router of CISCO type may be used. The router is used for the data transfer via LAN to the computer of the administration center. This is the expandable solution taking into account the number of supported lines, and it allows use of a virtually limitless number of data transfer lines. The computer with the installed GPSNet system receives this data via IP from the CISCO router. Remote reference stations are identified upon TCP/IP numbers;

A frame Relay-based link may be used. Although this method is not always available with the use of telephone networks, it may be the best method of long-distance data transfer. In this case, the data converter for the RS232 protocol must be used on the basic station. When only Frame Relay is used for the data transfer, a simple router may be installed in the administration center. Using such configuration, each remote station has its own IP address and the router translates the data from Frame Relay to LAN and vice versa;

The data may also be transferred via Internet with the use of DSL or any other access. In this case, the serial bus interface must be translated to TCP/IP.

Oil and gas pipeline systems are complex, dynamic and open geotechnical systems (GTS) that interact with the environment (external). The systems can negatively affect the environment. In its turn, the environment and its changes can affect the systems. Such interaction is clearly seen under permafrost conditions. Permafrost formations (PFF) used as foundations of engineering objects may be in both hard frozen and plastic frozen conditions. Due to that, the load-bearing capacity of PFF is changed, which leads to deformations of engineering objects. When critical parameters are achieved, deformation may cause emergency situations on the oil and gas pipelines as well as urgent repair works that require additional financial and economic expenses. The information about the technical and spatial-temporal condition of the GTS may be obtained with the help of the correctly organized geodetic monitoring. The geodetic monitoring of such objects is made at all stages of the life cycle of structures: research, construction, operation or their elimination.

The invention claimed is:

1. A method for monitoring positions of an above-ground pipeline located in areas subject to permafrost conditions using deformation control benchmarks on piles of support foundations, deep benchmarks, reference stations and a rover, the method comprising:

installing the deformation control benchmarks on piles of support foundations of the above-ground pipeline, the deformation control benchmarks being positioned at least 0.5 meters (0.5 m) above a ground surface;

installing the deep benchmarks spaced apart by 1.5 kilometers (1.5 km) or less and spaced at least 50 m from any of the support foundations;

installing the reference stations along the above-ground pipeline such that the reference stations are spaced from each other by between 20 km and 40 km from each other and are adapted to communicate with a server;

detecting initial coordinates of the deformation control benchmarks and the deep benchmarks during installation;

detecting initial heights of the above-ground pipeline at the locations of the benchmarks;

transmitting the detected initial coordinates and the detected initial heights to a server for building a digital pipeline model;

detecting subsequent coordinates and subsequent heights of the above-ground pipeline using the rover;

transmitting the detected subsequent coordinates and the detected subsequent heights of the above-ground pipeline to the server; and determining any deflection of the above-ground pipeline by comparing the detected initial heights of the above-ground pipeline and the detected subsequent heights of the above-ground pipeline by the server.

2. The method of claim 1 wherein the detected initial coordinates correspond to coordinates in a state coordinate system based on state geodetic network benchmarks and wherein the method further comprises converting the coordinates in the state coordinate system to coordinates in a local coordinate system based on the deep benchmarks.

3. The method of claim 1, wherein determining any deflection of the above-ground pipeline further includes determining that a deflection has occurred when a difference between the detected initial heights and the detected subsequent heights are greater than a predetermined value.

4. The method of claim 1, wherein detecting subsequent coordinates and subsequent heights is performed at least once per month for a first year of pipeline service and at least twice per year thereafter.

5. The method of claim 1, wherein a device equipped with a GNSS receiver and a means of wireless connection is used as a mobile receiver for the transmitting steps.

6. The method of claim 1, wherein detecting subsequent coordinates and subsequent heights of the above-ground pipeline using a GPS/GLONASS transmitter is performed by an optic control device.

7. The method of claim 1, wherein the deformation control benchmarks are made of rolled steel that forms a sharp angle and are attached to a metal pilework or a support pile in such way that a top of the sharp angle is a top point of the deformation control benchmark and are detected during pipeline service.

8. The method of claim 1, wherein each pile of the above-ground pipeline includes a separate deformation control benchmark.

9. The method of claim 1, wherein the deep benchmarks include a metal pipe and has a head made of the stainless steel with a polished spherical surface, the metal pipe being installed into a bore of a concrete anchor and equipped with a protective case made of a metal pipe and filled with a sandy non-frost-susceptible soil.

10. The method of claim 1, wherein the deep benchmarks are installed to a depth that corresponds to a location where maximum seasonal soil thawing occurs rounded up to a nearest meter and is at least 11 meters.

11. The method of claim 1, wherein height sensors are installed on pipeline compensators.

12. The method of claim 1, wherein each reference station includes a multi-frequency navigation units of GLONASS consumer or GLONASS/GPS of a phase mode, a multi-frequency GLONASS or GLONASS/GPS geodetic GNSS aerial device with multi-path and re-reflected signal suppression systems, an eccentricity value of a phase center that is no more than 2 mm, a device for fixing the reference station on a fixed object, a computer with a controller function to set up equipment of a permanent reference station, and software to perform main functions of the reference station.

13. A system for monitoring positions of an above-ground pipeline comprising:
- deformation control benchmarks installed on piles of support foundations of the above-ground pipeline;
- deep benchmarks installed in such a way that their height remains relatively constant regardless of effects of permafrost conditions;
- reference stations installed along the above-ground pipeline that include GNSS transmitters for creation of a local geodetic network; and
- a server coupled to the reference stations and to a rover and configured to:
- receive initial coordinate and height data from the rover regarding a height and a location of the deformation control benchmarks,
- receive subsequent coordinate and height data from the rover regarding a subsequent height and a subsequent location of the deformation control benchmarks, and
- determine whether deflection of the above-ground pipeline has occurred by comparing the initial coordinate and height data to the subsequent coordinate and height data.

14. The system of claim 13, wherein the deformation control benchmarks are made of rolled steel that forms a sharp angle and are attached to a metal pilework or a support pile in such way that a top of the sharp angle is a top point of the deformation control benchmark and are detected during pipeline service.

15. The system of claim 13, wherein each pile of the above-ground pipeline includes a separate deformation control benchmark.

16. The system of claim 13, wherein the deep benchmarks include a metal pipe and has a head made of the stainless steel with a polished spherical surface, the metal pipe being installed into a bore of a concrete anchor and equipped with a protective case made of a metal pipe and filled with a sandy non-frost-susceptible soil.

17. The system of claim 13, wherein the deep benchmarks are installed to a depth that corresponds to a location where maximum seasonal soil thawing occurs rounded up to a nearest meter and is at least 11 meters.

18. The system of claim 13, further comprising height sensors installed on pipeline compensators.

* * * * *